Inventors.
Friedrich Fillies
Günter Urban
BY Spencer & Kaye
ATTORNEYS.

United States Patent Office 3,714,762
Patented Feb. 6, 1973

3,714,762
ELECTROFILTER INSULATOR WITHOUT
DAMAGING DUST DEPOSITS
Friedrich Fillies, Winz-Niederwenigern, and Günter Urban, Essen-Bredeney, Germany, assignors to Fried. Krupp Gesellschaft mit beschrankter Haftung, Essen, Germany
Filed Aug. 28, 1970, Ser. No. 67,932
Claims priority, application Germany, Aug. 29, 1969, P 19 43 916.8
Int. Cl. B03c 3/34
U.S. Cl. 55—5                 5 Claims

ABSTRACT OF THE DISCLOSURE

Hot oxidizing gas is passed over electrofilter insulators to reduce the amount of FeO deposited thereon and to convert any such FeO to $Fe_2O_3$. The electrofilter is one primarily used to remove pyrophoric dusts, particularly those from carbon-monoxide-containing converter waste gases, in a reducing atmosphere.

CROSS REFERENCE TO RELATED APPLICATION

This application is related to application Ser. No. 654,247, filed July 18, 1967 (now abandoned), for "Waste Gas Dust Filtration."

BACKGROUND OF THE INVENTION

Electrofilters, such as those of U.S. Pat. 2,297,555, British Pat. 219,570 (accepted July 31, 1924) and French Pat. 529,210 (Nov. 25, 1921), have insulators. In the operation of such electrofilters to remove pyrophoric dusts, the electrical resistance of the insulators is reduced and spark-overs may occur. Dust deposited in a reducing atmosphere from incompletely burnt converter waste gases, for example, characteristically adheres particularly strongly to insulator surfaces. Electrical spark-overs occur on such soiled insulators and leave a melting track. Current continues to flow along such melting tracks until the insulator, which is ordinarily made of porcelain, is overheated and thus destroyed.

Insulators of electrofilters are cleaned by blowing air or a so-called cleaning gas over them. However, this procedure is successful only with loosely adhering dust. Strongly adhering dusts are not removed from the insulators even with pressurized gas, e.g. air, or surges of pressurized gas, respectively.

Moreover, blowing in larger quantities of air, which would then reach the interior of the filter, would cause the air to form an explosive gas mixture with the CO-containing converter waste gases.

When pure gas is used instead of air, other difficulties arise. The permissible content of residual dust still carried by the pure gas is sufficient to coat insulators gradually with strongly adhering dust.

SUMMARY OF THE INVENTION

The present invention relates to a method for preventing damaging dust deposits on insulators of an electrofilter wherein gas glows around the insulators. Pyrophoric dust, particularly dust from CO-containing converter waste gases, is separated in the electrofilter in a reducing atmosphere.

An object of the present invention is to prevent damaging dust deposits at the insulators of an electrofilter. A further object is to render deposited dust residues harmless for the insulators and make such residues easy to remove.

These objects are accomplished by feeding a hot oxidizing gas to the insulators and adjusting the temperature of the hot oxidizing gas so that the specific weight of the gas is less than that of gas from which the dust is to be removed.

Advisedly, the hot oxidizing gas is produced by burning a fuel in a burner and subsequently admixing the resulting burnt fuel with air.

The oxidizing effect of the hot oxidizing gas converts the dust particles (consisting essentially of FeO), which still reach the surface of the insulator under the influence of electrical field forces, into $Fe_2O_3$. The $Fe_2O_3$ adheres only loosely and leaves no melting track (resulting from electrical spark-overs) which would lead to the destruction of the insulator.

The present invention prevents damaging dust deposits from forming or remaining on insulators of an electrofilter which separates dusts from CO-containing converter waste gases. Operation of the electrofilter is thus maintained in a simple manner.

DETAILS

Figure 1:
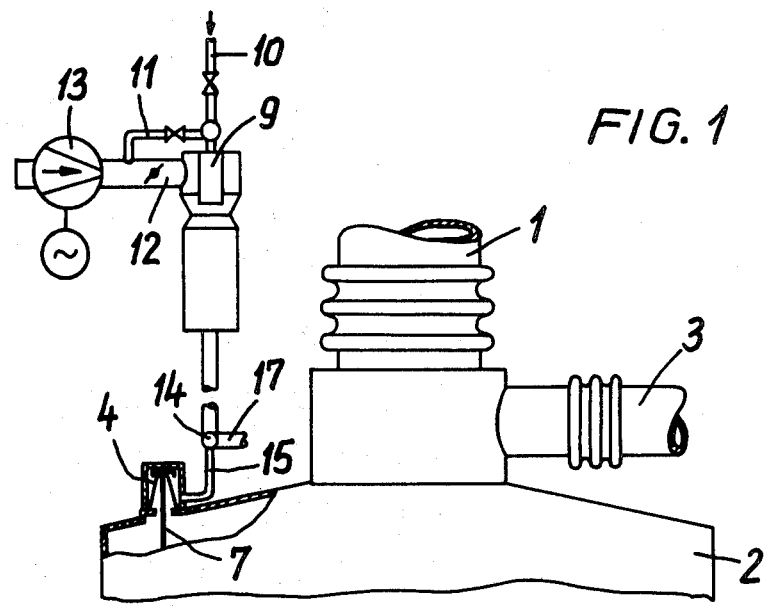
FIG. 1 shows the upper portion of an electrofilter with one insulator and means connected thereto for effecting the present invention.

With reference to the drawings, CO-containing converter waste gases are introduced into electrofilter 2, e.g. an electrofilter according to application Ser. No. 654,247 of July 18, 1967, through input pipe 1 and leave the filter through pipe 3. Insulator 4 consists of insulating body 5, which has the shape of a hollow frustum of a cone, and plate 6 on which suspension element or armature 7 is supported by nut 8. At the lower end of armature 7 is an upper holding frame for the discharge electrodes of the electrofilter. The electrofilter has an upper and a lower supporting frame, each of which is suspended from at least three insulators 4 supported by the filter housing.

FIG. 1 shows a burner 9 into which a fuel, e.g. natural gas, is fed at a rate of, e.g., 10 liters per second through line 10 and primary air, at a rate of, e.g., 100 liters per second through line 11. The spent fuel is admixed with, e.g., 1000 liters per second of air in a line 12 which is connected with a blower 13. The thus produced hot oxidizing gas, having a temperature of, e.g., 260° C. and a specific gravity of, e.g., 0.67 kg./m.³, reaches a distributor 14 and is passed from there through a line 15 under a pressure of e.g., 10 mm. Hg to a hood 16 enclosing insulator 4. The hood is sealed to the filter housing. A line 17 branching off from distributor 14 leads to the other insulators. (The foregoing figures apply to a filter having about 30 to 50 insulators.)

Burner 9 may be any of numerous known burners.

Illustrative fuels are natural gas, mixed gas, blast furnace gas, coke-oven gas, and oil.

The rate of fuel feed through line 10 depends on the heat value of the fuel. The volumetric ratio of air admixed with the fuel (through line 11) prior to burning depends somewhat on the particular fuel employed.

The temperature of the admixture (hot oxidizing gas) of air with burned gaseous fuel varies from 160° to 360° C., preferably from 240° to 280° C.

The hot oxidizing gas has a specific gravity of from 0.55 to 0.75 kg./m.³ and is introduced into hood 16 under a pressure of from 5 to 15 mm. Hg.

Figure 2:
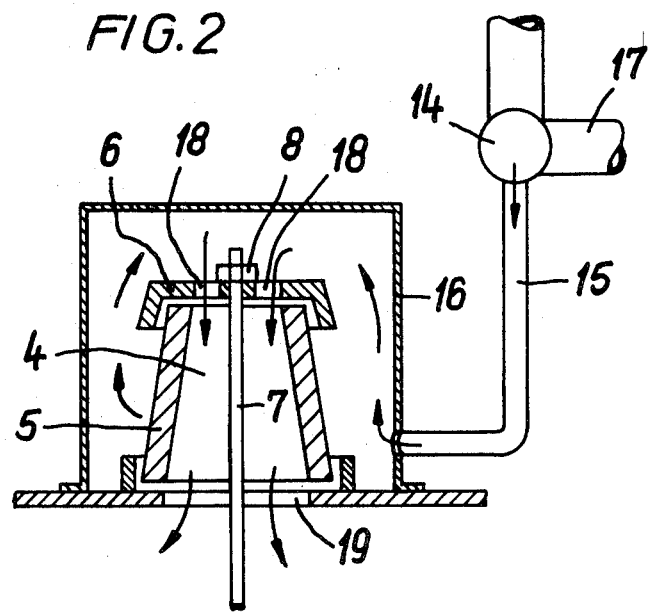
FIG. 2 shows the insulator of FIG. 1 in a sectional view on an enlarged scale.

In accord with the arrows (FIG. 2) the hot oxidizing gas passes on the outside as well as on the inside of insulating body 5 and shields it. The gas reaches bores 18 in plate 6 and bore 19 in the filter housing and thus the interior of the electrofilter. Since the specific weight of the hot oxidizing gas is low, a gas cushion is formed in the insulating body 5 and directly therebelow which substantially prevents penetration of the dust into the area of the insulating body 5. A small quantity of the oxidizing hot gas leaves the gas cushion and mixes with converter waste gas. This slight amount of gas is returned to insulator 4. No danger of explosion results from the admixture of such small amounts of oxidizing hot gases with converter waste gases.

It will be understood that the above description of the present invention is susceptible to various modifications, changes, and adaptations, and the same are intended to be comprehended within the meaning and range of the equivalents of the appended claims.

We claim:

1. A method for preventing damaging dust deposits on a surface of an insulator of an electrofilter for separating pyrophorous dust from waste gas in a reducing atmosphere which comprises directing and maintaining a hot oxidizing gas over the surface of the insulator, the hot oxidizing gas being at a temperature at which the specific gravity thereof is less than the specific gravity of the waste gas.

2. A method according to claim 1 wherein the waste gas is carbon-monoxide-containing converter waste gas.

3. A method according to claim 2 wherein the hot oxidizing gas is a direct admixture of burned fuel and air.

4. A method according to claim 3 wherein the fuel is a gaseous fuel.

5. A method according to claim 3 wherein the temperature and/or the composition of the hot oxidizing gas is controlled by varying the ratio of consumed fuel and admixed air.

References Cited

UNITED STATES PATENTS

| | | | |
|---|---|---|---|
| 1,391,436 | 9/1921 | Welch | 174—14 BH X |
| 1,508,367 | 9/1924 | Matlock | 55—135 X |
| 1,884,085 | 10/1932 | Miller | 55—11 X |
| 2,130,483 | 9/1938 | Bull | 55—101 UX |
| 2,215,267 | 9/1940 | Hedberg et al. | 55—5 |
| 2,720,551 | 10/1955 | Wastvind et al. | 55—101 X |
| 2,726,730 | 12/1955 | MacKenzie | 55—146 UX |
| 3,004,833 | 10/1961 | Loewen | 55—120 X |
| 3,033,918 | 5/1962 | Wiemer | 174—139 |
| 3,238,702 | 3/1966 | De Seversky | 55—119 |
| 3,248,854 | 5/1966 | Plass | 55—4 |
| 3,410,288 | 11/1968 | Hajek | 266—35 X |
| 3,531,918 | 10/1970 | Vegeby | 174—211 X |
| 3,595,983 | 7/1971 | Muller | 174—31.5 |

FOREIGN PATENTS

| | | | |
|---|---|---|---|
| 702,865 | 1/1954 | Great Britain | 55—146 |
| 355,220 | 12/1937 | Italy | 55—146 |

DENNIS E. TALBERT, JR., Primary Examiner

U.S. Cl. X.R.

55—120, 146, 148; 174—15 BH